US007576689B2

(12) United States Patent
Weedon

(10) Patent No.: US 7,576,689 B2
(45) Date of Patent: Aug. 18, 2009

(54) METHOD AND APPARATUS FOR CONTROLLING A FREQUENCY SOURCE

(75) Inventor: Robert John Weedon, Chandlers Ford (GB)

(73) Assignee: Roke Manor Research Limited, Romsey (GB)

(*) Notice: Subject to any disclaimer, the term of this patent is extended or adjusted under 35 U.S.C. 154(b) by 0 days.

(21) Appl. No.: 11/826,792

(22) Filed: Jul. 18, 2007

(65) Prior Publication Data
US 2008/0143597 A1 Jun. 19, 2008

(30) Foreign Application Priority Data
Aug. 1, 2006 (GB) ................... 0615233.4

(51) Int. Cl.
G01S 5/14 (2006.01)
(52) U.S. Cl. ................................. 342/357.02
(58) Field of Classification Search ............ 342/357.02, 342/357.12
See application file for complete search history.

(56) References Cited

U.S. PATENT DOCUMENTS 4,646,096 A 2/1987 Brown
5,155,490 A * 10/1992 Spradley et al. ........ 342/357.03
6,407,699 B1 * 6/2002 Yang ..................... 342/357.12
6,452,541 B1 * 9/2002 Zhao et al. ............. 342/357.06
2001/0053699 A1 12/2001 McCrady et al.
2006/0195262 A1 * 8/2006 Draganov ................... 701/214

FOREIGN PATENT DOCUMENTS

GB 2 250 154 A 5/1992
WO WO 2004/048997 A1 6/2004

OTHER PUBLICATIONS

Braasch, M. S. et al., "GPS Receiver Architectures and Measurements", Proceedings Of The IEEE, Jan. 1999, pp. 48-64, vol. 87, No. 1.
European Search Report dated Nov. 22, 2007 (Six (6) pages).
Great Britain Search Report dated Nov. 20, 2006 (Seven (7) pages).

* cited by examiner

Primary Examiner—Gregory C Issing
(74) Attorney, Agent, or Firm—Crowell & Moring LLP

(57) ABSTRACT

A method is provided for controlling a clock for use in a frequency source. In the method a time bias is determined by determining the Accumulated Doppler Range of a signal source at different time intervals. The drift of a local clock is determined by determining the difference between the different time intervals and the clock may then be corrected. Apparatus is also provided and the invention has particular application to a multilateration system.

9 Claims, 2 Drawing Sheets

METHOD AND APPARATUS FOR CONTROLLING A FREQUENCY SOURCE

Figure 1:
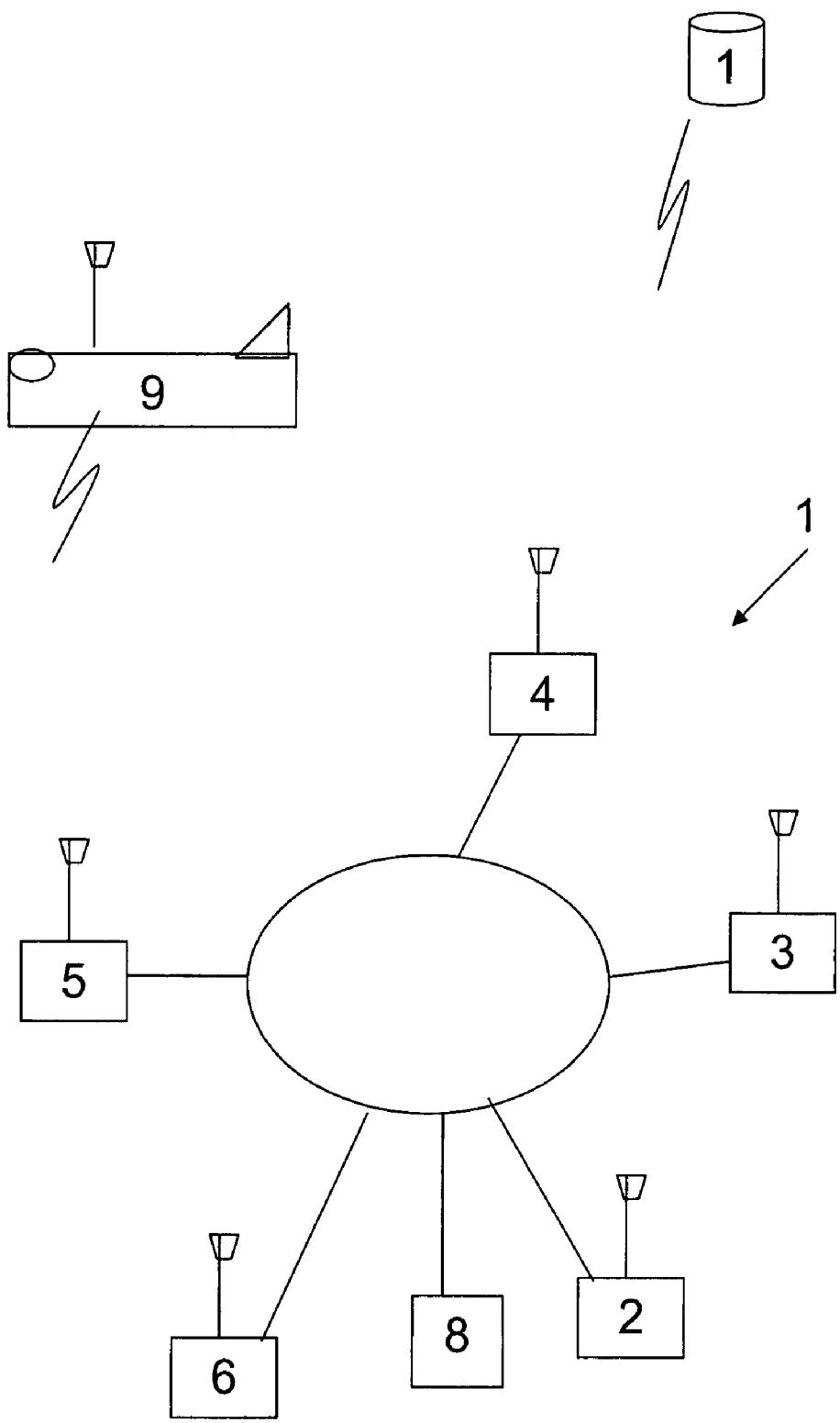

This invention relates to a method and apparatus for determining the performance of a clock and of a frequency source and also provides a method and apparatus for controlling the clock and a frequency source. The apparatus is applicable, in particular, to a multilateration system.

Many items of electronic equipment require a frequency source for their operation. In some equipment, the source must have a high degree of accuracy and, in yet further types of equipment, it is necessary to determine the accuracy, and to also adjust the frequency source, as its performance varies. An example of an application of the latter kind is a receiver station in a multilateration system. The invention will be described in such a context but it will have a broader range of applications.

A multilateration system is an arrangement of receiver stations located at different geographical locations which receive a signal transmitted from an object the position of which is to be located. For example, an aircraft positioning system is a current application for multilateration. The aircraft transmits a signal which is received by ground based receivers and the time of arrival, given that the position of the receivers is known, is used to determine the position of the aircraft at the time of transmission. Such a system is described in GB2250154 A the contents of which are incorporated herein by reference.

Each receiver station in the system needs an accurate frequency source for successful operation. As will be appreciated, for such safety critical applications involving often fast moving aircraft, accuracy and reliability is not a trivial matter. It is therefore not unusual to have expensive atomic clock based local frequency references such as a rubidium or caesium oscillator. However, even these suffer from performance drift particularly with environmental changes such as, in particular, temperature variation in respect of Rubindium oscillators.

It is important for accuracy, that all the receiver stations have frequency references that provide the same frequency within certain limits of accuracy. This is called syntonization.

It has been proposed to achieve syntonization in a multilateration system by a process of message interchange between the receiver stations and a central controller. However, this is considered undesirable since this will increase inter-station communication traffic and also has to cater for the effect of a station (or a communication link between the stations) developing a fault rendering it incapable of communicating the required data or acting on the required instructions.

The present invention provides a method and apparatus that eliminates or alleviates the requirement for inter-station communication. One aspect provides a method and apparatus to enable determination of the performance of a clock to control frequency reference.

According to the invention, in a first aspect, there is provided a method of determining a clock offset of a local clock at a receiver comprising receiving a signal from an external source at a respective first time and a second time, determining from the signal a respective Accumulated Doppler Range (ADR) at the receiver at the respective first and second time, determining a range from the external source to the receiver, determining the signal frequency, determining from the range, the signal frequency and the respective Accumulated Doppler Ranges respective clock bias at the respective times, and determining from the respective clock biases the drift of the local clock.

Preferably, the drift is determined by subtracting the first and second biases and dividing by the time interval between the first and the second time.

Advantageously, a pseudo-range value to the signal source is determined, the range value is subtracted from the pseudo-range value to determine a pseudo-range residual and wherein the clock is adjusted in accordance with the residual to minimise the residual over time.

Conveniently, the signal is a GNSS and in particular a GPS signal transmitted from a satellite.

A second aspect of the invention provides apparatus as recited in the independent claim.

The clock may be used to provide a frequency source and the apparatus is, in accordance with a further aspect, incorporated into a multilateration system.

Figure 2:
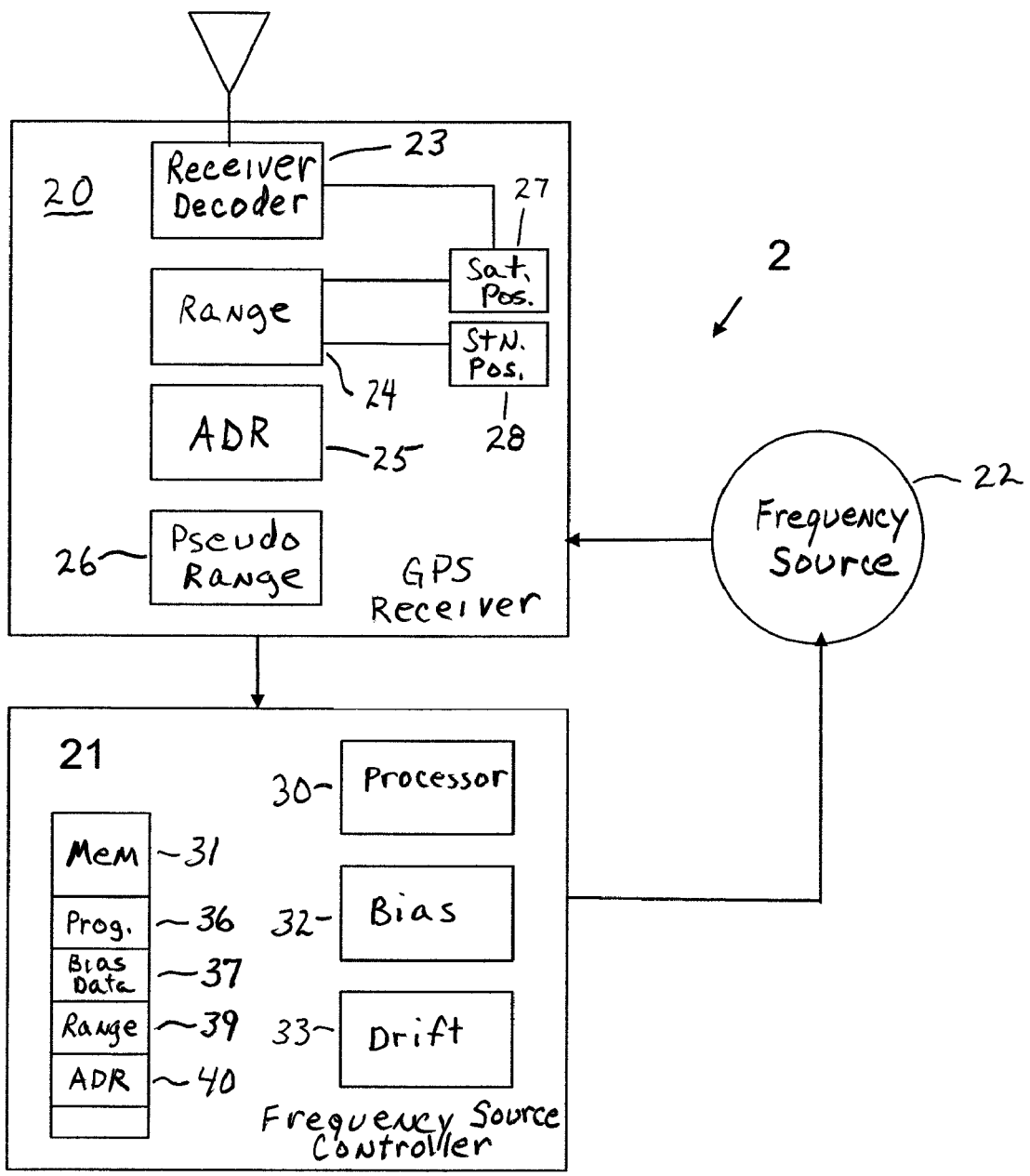

A specific embodiment of the invention will now be described with reference to, and as illustrated by, the accompanying drawings in which:

FIG. 1 shows a receiver station in a multilateration system operating in accordance with the invention; and FIG. 2 shows a receiver station of the multilateration system shown in FIG. 1.

As is shown in FIG. 1, a multilateration system 1 includes a number of ground based receiver stations 2 to 6, interlinked to a controller station 8. The multilateration system performs a multilateration function on signals transmitted from aircraft 9 in order to determine its location. A multilateration system is described in GB2250154 A and shall this part of the systems operation does not require further explanation for the person skilled in the art.

FIG. 2 shows one of the receiver stations labelled 2 for convenience although all the receiver stations are identical. In addition to a multilateration receiver section (not shown), for receiving the signal from the aircraft 9 for use in the multilateration process, there is a Global Positioning System (GPS) receiver 20. This receives a GPS signal from a satellite 10 shown in FIG. 1 (It may also be another Global Navigation Satellite System GNSS.). The GPS receiver output is passed to a frequency source controller 21. This produces a clock control signal to be passed to a frequency source 22. The frequency source 22 is a rubidium based atomic clock. Other types of clocks may also be used.

The GPS receiver 20 includes as is shown in FIG. 2 a receiver decoder section 23 which decodes signals arriving from the satellite 10, a range determiner 24 for determining the range to the satellite, an Accumulated Doppler range determiner 25, a pseudo-range determiner 26. The satellite signal decoded by the receiver/decoder 23 provides data as to the satellite position. This is loaded into a memory division 27. A further memory division 28 holds the position of the receiver station provided when the station is commissioned.

The range determiner 24 determines the range R to the satellite by referring to the position data held in the memory divisions 28 and 27 and determining the distance between the receiver position and the satellite position.

The ADR determiner 25 determines the Accumulated Doppler Range (ADR) from the receiver station 2 to the satellite 10. The ADR, or carrier phase, data is provided by high quality GNSS receivers and is a measure of the range to the satellite derived from the underlying carrier rather than data modulated upon it. Calculation of ADR is well known to people skilled in the art of GNSS receiver design.

The pseudo-range determiner 26 determines the pseudo-range from the receiver station to the satellite 10. The psuedorange is a measure of the distance from satellite to receiver including terms relating to the offset in GNSS time and receiver clock.

The determined values are output to the frequency source controller 21 which includes a processor 30 and associated memory 31. It is programmed to provide blocks of functionality and in particular provides a bias determiner 32 and a drift determiner 33. The memory 31 includes memory 36 allocated for program instructions governing the operation of the processor 30, a bias memory 37 for holding derived bias data, a range memory 39 holding range data and an ADR memory 40 to hold the ADR data.

The bias determiner 32 accesses the ADR values from memory 40. It derives for each pair of successive values at a first and a second time interval the bias of the receiver from the relationship.

$$b_{cp}(t1)=-ADR1/f-R/C \text{ and } b_{cp}(t2)=-ADR2/f-R/C$$

Where t1 is the first time interval and t2 the second time interval,

ADR1 and ADR2 are the ADR values at time intervals t1 and t2, f is the GPS frequency L1=1575.42 MHz, C is the speed of light and R is the range from Range memory 39 where CP denotes carrier phase.

The bias values are then stored into the bias memory 37.

The drift determiner 33 then calculates the drift d from the values held in the bias memory using the relationship.

$$d = \frac{b_{cp}(t2) - b_{cp}(t1)}{t}$$

Where t is the time between t2 and t1 and thus for a one second time interval the drift is given by:

$$d = b_{cp}(t2) - b_{cp}(t1)$$

The drift d is a measure of how much the frequency source 22 varies from the correct value and the frequency source controller 21 derives from this value an instruction to be passed to the frequency source to speed up or to slow down as appropriate.

This process has been found to cater well for trimming of the frequency source 22 during short time frames. However, in an enhancement to the aforementioned method the pseudo range is determined and utilized to correct the frequency source 22 over a wider drift range. The pseudo range is determined by the GPS receiver 20. In a next step the frequency source controller 21 determines a correction value N from the relationship:

$$N = R - \text{pseudorange}.$$

The value N will be used to generate a control signal as before to speed up or to slow down the frequency source 21 as appropriate.

The invention claimed is:

1. A method of operating a local clock at a receiver, said method comprising:

receiving a signal from an external source at respective first and second times;

determining from the signal a respective Accumulated Doppler Range (ADR) at the receiver at the respective first and second times;

determining a range from the external source to the receiver;

based on the range, a signal frequency of said signal, and the respective Accumulated Doppler Ranges, determining a respective clock bias at each of the respective times;

determining from the respective clock biases the drift of the local clock;

determining at the receiver a pseudo range between the receiver and the signal source;

subtracting the determined range from the pseudo range to determine a clock coarse correction factor; and applying the clock coarse correction factor to the clock.

2. The method as claimed in claim 1 wherein the drift of the clock is used to derive a clock correction signal to be applied to the clock.

3. The method as claimed in claim 1, further comprising applying the clock signal to a local frequency generator.

4. The method as claimed in claim 1, wherein the signal is a Global Navigation Satellite System signal.

5. Apparatus for operating a clock at a receiver station comprising:

a receiver for receiving a signal from an external signal source at respective first and second times;

ADR determining means for determining from the signal a respective Accumulated Doppler Range (ADR) at the receiver at the respective first and second times;

Range determining means for determining a range from the external source to the receiver;

bias determining means for determining from the range, a signal frequency of said signal, and the respective Accumulated Doppler Ranges, a respective clock bias at each of the respective times;

drift determining means for determining from the respective clock biases the drift of the local clock;

a pseudo range determiner to determine at the receiver a pseudo range between the receiver and the signal source;

means for subtracting the determined range from the pseudo range to determine a clock coarse correction factor; and means to apply the clock coarse correction factor to the clock.

6. The apparatus as claimed in claim 5, further comprising a frequency source controller to derive from the drift of the clock a clock correction signal to be applied to the clock.

7. The apparatus as claimed in claim 5, comprising means to apply the clock signal to a local frequency generator.

8. The apparatus as claimed in claim 5, wherein the receiver is a GNSS Positioning System receiver to receive GNSS signals from the remote source.

9. A multilateration system comprising a plurality of receiver stations comprising apparatus as claimed in claim 5.

* * * * *